UNITED STATES PATENT OFFICE.

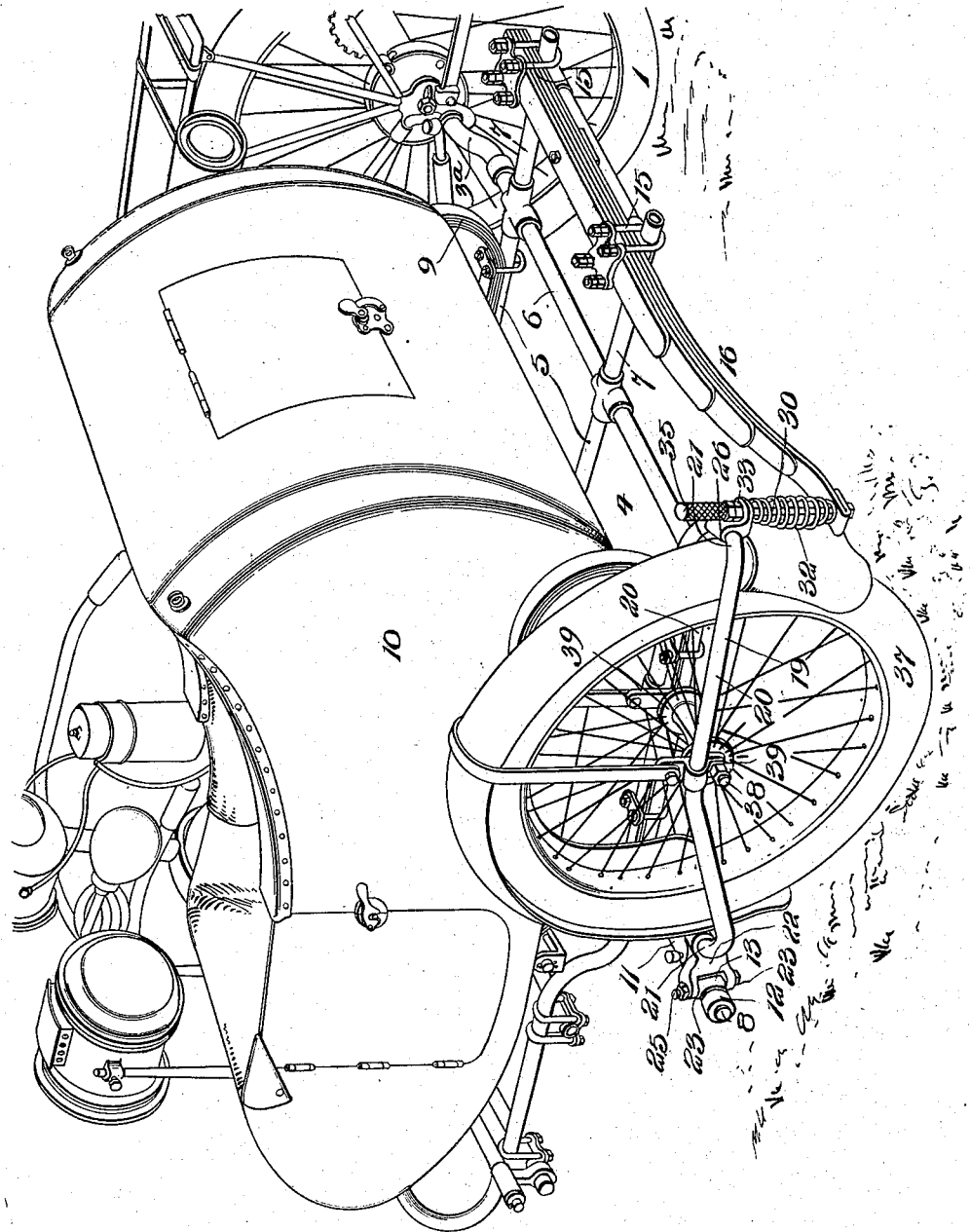

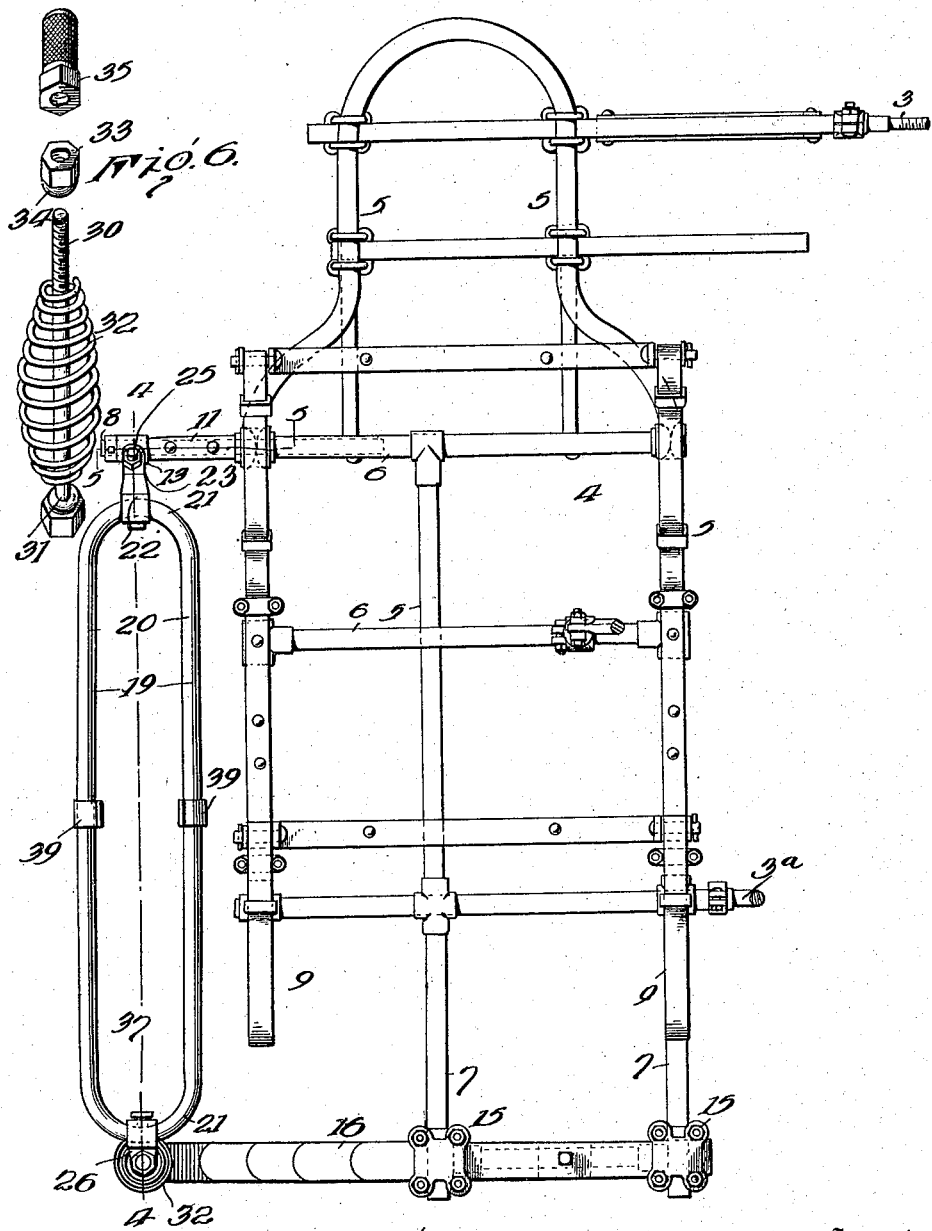

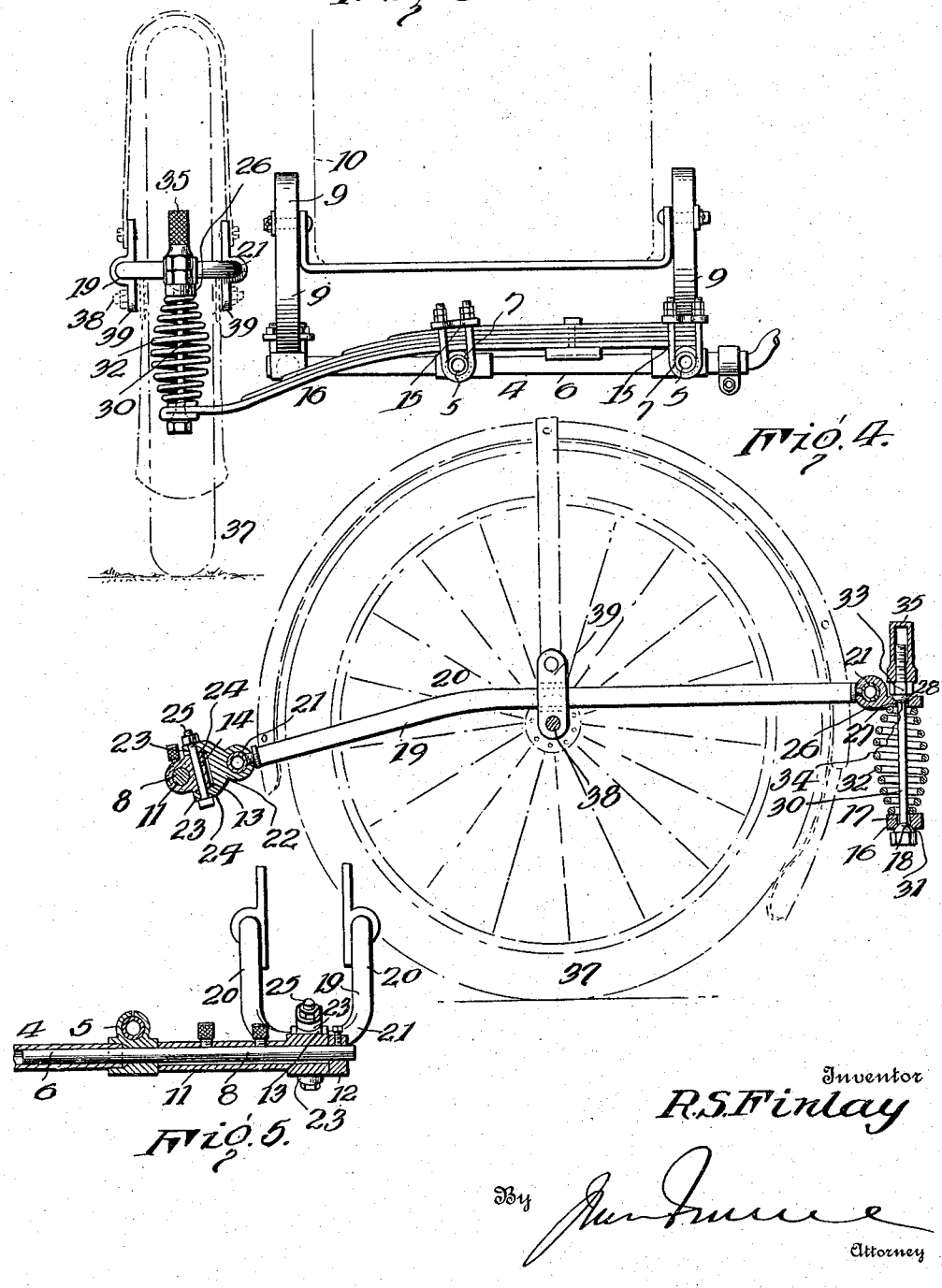

ROBERT S. FINLAY, OF MELBOURNE, VICTORIA, AUSTRALIA.

SIDE CAR.

1,215,265.　　　　Specification of Letters Patent.　　Patented Feb. 6, 1917.

Application filed October 24, 1916. Serial No. 127,456.

*To all whom it may concern:*

Be it known that I, ROBERT S. FINLAY, a subject of the King of Great Britain, residing at Melbourne, Victoria, in the Commonwealth of Australia, have invented certain new and useful Improvements in Side Cars, of which the following is a specification.

This invention relates to improvements in what has become known as side cars, used in connection with motor cycles.

In practically all the side cars known to me, the supporting wheel is mounted on a shaft rigidly fastened to the chassis. This construction has in numerous cases proven dangerous, and in addition it allows the road shocks to be transmitted to the chassis and the motor, and ultimately to the passenger and rider. Furthermore, this construction causes undue strain and consequent wear on the parts greatly to the detriment of the mechanism.

The purpose of my invention is to provide means for permitting the wheel supporting the side car to give slight vertical and lateral movement independently of the chassis to absorb the shocks, and prevent to a great degree transference of the shocks to the passenger and rider.

One of the objects of my invention is to provide a cradle in which the side wheel is mounted, and to mount the cradle so that it will permit the wheel to accommodate itself to road inequalities and absorb the shocks, without same being transferred to the chassis.

A further object of my invention is to provide improved resilient supporting means for the cradle in which the side wheel is mounted, to prevent transference of road shocks to the chassis.

The invention also comprehends improvements in the details of construction and arrangement of parts, which will be hereinafter described and particularly pointed out in the claims.

In the drawings:

Figure 1 is a perspective view of my improved side car.

Fig. 2 is a top plan view of the chassis.

Fig. 3 is a rear view of the same.

Fig. 4 is a detail longitudinal section on the line 4—4 of Fig. 2.

Fig. 5 is a detail transverse section on the line 5—5 of Fig. 2.

Fig. 6 is a detail perspective view of the rear connection between the cradle and the chassis, the parts being separated.

The numeral 1 indicates a motor cycle, the front of which is mounted on a stub axle 3, extending from the chassis 4, while the rear is connected at 3ª. The chassis 4, comprises longitudinal bars 5, and cross bars 6. Two of the longitudinal bars 5, are extended rearwardly, as at 7, and one of the cross bars is laterally extended to form a stub axle 8, substantially mid-way of the length of the chassis. Supported on the two outside longitudinal bars 5, are the springs 9, which support the car body 10.

A sleeve 11, is mounted on the stub shaft 8, and is held in place by a collar 12, screwed or otherwise locked to the stub axle. Extending rearwardly from the sleeve is a lug 13, formed with an opening 14.

Secured to the extended ends 7, of the longitudinal bars, by clips 15, is a cantaliver spring 16, the free end of which is formed with an opening 17, which is in substantial longitudinal alinement with the opening 14, in the lug 13. The lower portion of the spring surrounding the opening 17, is concave to form a seat 18, for a purpose to be described.

The numeral 19, indicates what I term a cradle, which comprises two spaced longitudinal bars 20, connected at the ends, as at 21. Extending from the end bar 21, is a yoke 22, the ears 23, of which are formed with alined openings 24, and engage the upper and lower surfaces of the lug 13, and extended through the openings 24, and the opening 14, in the lug 13, is a king bolt 25. This construction provides a universal connection between the cradle and the chassis, the sleeve rocking on the stub axle, permitting vertical movement, while the king bolt connection permits of a horizontal or lateral motion of the cradle. Extending from the rear cross bar 21, of the cradle, is a lug or bracket 26, formed with a vertical opening 27, the upper surface of the lug surrounding the opening 27, being concave to form a seat 28. The lug 26, is disposed over the free end of the cantaliver spring 16, and the openings 17 and 27 are in vertical alinement. A bolt 30, extends loosely through the spring and the lug to connect said spring and the cradle. The head of the bolt is semi-spherical as at 31, and engages in the concave seat surrounding the opening 17.

Surrounding the bolt, and interposed between the spring 16 and the lug 26, is a coiled spring 32, and screwed on the bolt 30, is a nut 33, provided on its under side with a semi-spherical head 34, which engages in the concave seat 28, surrounding the opening in the lug 26; a lock nut 35 engaging the bolt to hold the nut in set position.

This connection between the cantaliver spring 16 and the cradle permits the latter to rock laterally and vertically to correspond with similar movements of the connection between the front of the cradle and the stub shaft. The semi-spherical head on the bolt and nut will readily allow the cradle to rock, while the coil spring will permit vertical movement between the parts and yet return the elements to normal position.

The side wheel 37, is mounted on an axle 38, supported in bearing 39, secured to the side bars of the cradle. By mounting the cradle in the manner described, the axle obtains a bearing at each end, which affords a more substantial and stable construction, and one which will cause the cradle to respond more readily to the road surface in transference of shocks to the springs.

The coil spring is designed to absorb the minor shocks, as the wheel passes over the road surface and prevents "chattering" or rattling of the parts. The cantaliver spring absorbs the greater shocks, and as these take place at a point remote from the main portion of the chassis, it is obvious that the passenger is, comparatively speaking, free from undue shaking.

By the construction described the side wheel can be interchanged with the front wheel of the motor cycle, a feature which may be of practical value in the operation of the car.

From the foregoing description it is evident I have provided a construction which will effectually reduce jars and shocks, both to the mechanism and the passenger and rider. The parts are so arranged that the cradle rocks according to the road inequalities, with the result that the chassis is free from the effects of rough surfaces.

What I claim is:—

1. In a side car, the combination of a chassis, a cradle, means for supporting the cradle on the chassis, including a connection to permit the cradle to rock vertically and laterally, and a spring to absorb shocks incident to the vertical and lateral movement of the cradle, and a wheel mounted in the cradle.

2. In a side car, the combination of a chassis having a stub shaft, a cradle, a universal connection between the cradle and the stub shaft, a resilient connection between the opposite end of the cradle and the chassis, and a wheel supported in the cradle.

3. In a side car, the combination of a chassis, a cradle comprising two parallel spaced bars connected at their ends, a universal connection between one end of the cradle and the chassis, a resilient connection at the opposite end of the cradle and the chassis, a bearing on each of the side bars of the cradle, a shaft supported at its ends in said bearings, and a wheel mounted on the shaft.

4. In a side car, the combination of a chassis having a stub shaft extending therefrom, a cantaliver spring extending from and supported on the chassis, a cradle, a universal connection between the stub shaft and the cradle, a resilient connection between the cradle and the outer end of the cantaliver spring, and a wheel supported in the cradle.

5. In a side car, the combination of a chassis and a cradle carrying a wheel, means for supporting the cradle on the chassis to permit vertical and lateral movement, including a cantaliver spring supported on and extending from the chassis.

6. In a side car, the combination of a chassis having a shaft extending therefrom, a cradle carrying a wheel, a universal connection between the shaft and the cradle, a spring extending from the chassis, a bolt connecting the spring and the cradle, means between the bolt, cradle and spring to permit movement of the cradle corresponding to the movement of the universal joint, a spring interposed between the cradle and the first mentioned spring, and a wheel mounted on the cradle.

7. In a side car, the combination of a chassis, a cradle carrying a wheel, means at opposite ends of the cradle to support same on the chassis to permit universal movement of said cradle independently of the chassis, and resilient means for absorbing shocks due to said movements.

8. In a side car, the combination of a chassis, a cradle carrying a wheel, a universal connection between the front end of the cradle and the chassis, a universal connection between the rear end of the cradle and the chassis including a bolt having semi-spherical portions fitting in and operating in seats formed in adjacent parts, and a spring surrounding the bolt to absorb shocks incident to the movement of the cradle.

9. In a side car, the combination of a chassis having a stub shaft and longitudinal bars, certain of the latter being extended beyond the others, a cantaliver spring fastened to the extended portions of the side bars and projecting laterally from the chassis, a cradle carrying a wheel, a universal connection between the stub shaft and the cradle, a universal connection between the extended end of the cantaliver spring and the cradle, and a spring interposed between the cradle and the cantaliver spring to absorb shocks incident to the movement of the cradle.

10. In a side car, the combination of a chassis having a stub shaft at its forward end to support a motor wheel, and a stub shaft on the opposite side and in rear of the plane of the forward stub shaft, a cantaliver spring attached to the rear of the chassis and extended laterally therefrom, a cradle having a yoke at its forward end, a sleeve mounted on the second mentioned stub shaft provided with a lug which engages in the yoke, a bolt connecting the yoke and the lug, a bolt loosely connecting the rear end of the cradle and the cantaliver spring, a coil spring surrounding the bolt and superposed between the cantaliver spring and the cradle, and a wheel mounted in the cradle.

11. In a side car, the combination of a chassis, a cradle located on one side of the chassis, a spring extended laterally from the chassis, means connecting the front of the cradle with the chassis, means connecting the rear of the chassis with the spring, both said connecting means permitting vertical and lateral movements of the cradle, and a wheel supported by the cradle.

12. In a side car, the combination of a chassis, an elongated cradle mounted on one side of the chassis, a supporting wheel mounted in the cradle, means at opposite ends of the cradle for attaching the same to the chassis, said attaching means including means to permit the cradle to pivotally move in a vertical and lateral direction due to road irregularities, and a spring extending between the cradle and the attaching means at one end of the cradle to absorb shocks.

13. In a side car, the combination of a chassis, a cradle, a universal connection between the chassis and the cradle, a resilient connection between the opposite end of the cradle and the chassis, and a wheel supported in the cradle.

14. In a side car, the combination of a chassis, a cradle, a universal connection between the chassis and the cradle, a wheel supported in the cradle, and a cantaliver spring extending from the chassis to the cradle.

15. In a side car, the combination of a chassis, a cradle, a universal connection between the chassis and the cradle, a cantaliver spring extending from the chassis, and a connection including a spring between the end of the cantaliver and the cradle.

16. In a side car, the combination of a chassis, a cradle, a universal connection between the chassis and one end of the cradle, a cantaliver spring extending from the chassis, and a loose connection between the opposite end of the cradle and the cantaliver spring.

17. In a side car, the combination of a chassis, a cradle, means for universally connecting the cradle to the chassis, a wheel supported in the cradle, a cantaliver spring, and a loose connection between the cantaliver spring and the cradle, to permit the universal connection to operate due to road irregularities, the cantaliver spring absorbing the shocks.

18. In a side car, the combination of a chassis, a stub shaft extending therefrom, a cantaliver spring extending from the chassis, a cradle between the stub shaft and the cantaliver spring, a universal connection between one end of the cradle and the stub shaft, a loose connection including a spring between the opposite end of the cradle and the cantaliver spring, and a wheel supported by the cradle.

19. In a side car, the combination of a chassis, a stub shaft extending therefrom, a cradle including a pair of parallel bars, a universal connection between the stub shaft and the cradle, a cantaliver spring extending from the chassis, a loose connection between the cantaliver spring and the cradle, alined bearings mounted on the side bars of the cradle, an axle having its opposite ends supported in the bearings, and a wheel mounted on the axle.

20. In a side car, the combination of a chassis, a cradle, a universal connection between one end of the cradle and the chassis, a connection between the opposite end of the cradle and the chassis including a loosely mounted rod and a coiled spring, and a wheel mounted in the cradle.

In testimony whereof I affix my signature in the presence of two witnesses.

ROBERT S. FINLAY.

Witnesses:
O. B. SCANDLING,
JOSEPH MOORE.

Copies of this patent may be obtained for five cents each, by addressing the "Commissioner of Patents, Washington, D. C."